May 12, 1959     T. D. PRICE ET AL     2,886,409
IMPROVED PROCESSES FOR RECOVERING AND PURIFYING URANIUM
Filed Sept. 18, 1945     6 Sheets-Sheet 1

INVENTORS.
THOMAS D. PRICE
ANGUS V. HENRICKSON
BY
ATTORNEY.

May 12, 1959     T. D. PRICE ET AL     2,886,409
IMPROVED PROCESSES FOR RECOVERING AND PURIFYING URANIUM
Filed Sept. 18, 1945     6 Sheets-Sheet 2

INVENTORS.
THOMAS D. PRICE
ANGUS V. HENRICKSON
BY
ATTORNEY.

May 12, 1959     T. D. PRICE ET AL     2,886,409

IMPROVED PROCESSES FOR RECOVERING AND PURIFYING URANIUM

Filed Sept. 18, 1945     6 Sheets-Sheet 4

INVENTORS.
THOMAS D. PRICE
BY ANGUS V. HENRICKSON

ATTORNEY.

United States Patent Office 2,886,409
Patented May 12, 1959

2,886,409

IMPROVED PROCESSES FOR RECOVERING AND PURIFYING URANIUM

Thomas D. Price and Angus V. Henrickson, Oak Ridge, Tenn., assignors to the United States of America as represented by the United States Atomic Energy Commission Application September 18, 1945, Serial No. 617,124

6 Claims. (Cl. 23—14.5)

The present invention relates to processes of reclaiming uranium from a calutron and, in certain of its aspects, it relates more particularly to improvements in certain steps of the processes disclosed in the copending application of Martin D. Kamen and Abel De Haan, Jr., Serial No. 542,378, filed June 27, 1944, which issued as Patent No. 2,771,340 on November 20, 1956.

It is an object of the invention to provide an improved process of reclaiming uranium from a calutron.

Another object of the invention is to provide an improved process of recovering the residue of a uranium compound which has been subjected to treatment in a calutron from the parts of the calutron disposed in the source region thereof upon which the residue is deposited.

Another object of the invention is to provide an improved process of recovering metallic uranium enriched with $U^{235}$ from the collector of a calutron upon which the enriched metallic uranium is deposited.

A further object of the invention is to provide an improved process of purifying uranium which has been recovered from a calutron.

A further object of the invention is to provide a process of reclaiming uranium from a wash solution derived from a calutron in which the solution is subjected to the reducing action of a liquid amalgam prior to separating uranium in a lower oxidation state from metal impurities in the wash solution.

A still further object of the invention is to provide a process of reclaiming uranium from a wash solution derived from a calutron in which the wash solution is subjected to the reducing action of a liquid amalgam, such as zinc amalgam, prior to separation of the uranium as uranous oxalate from metal impurities in the wash solution.

A still further object of the invention is to provide an improved process of salvaging fractions of uranium which have been previously subjected to primary uranium recovery treatment.

Figure 1:
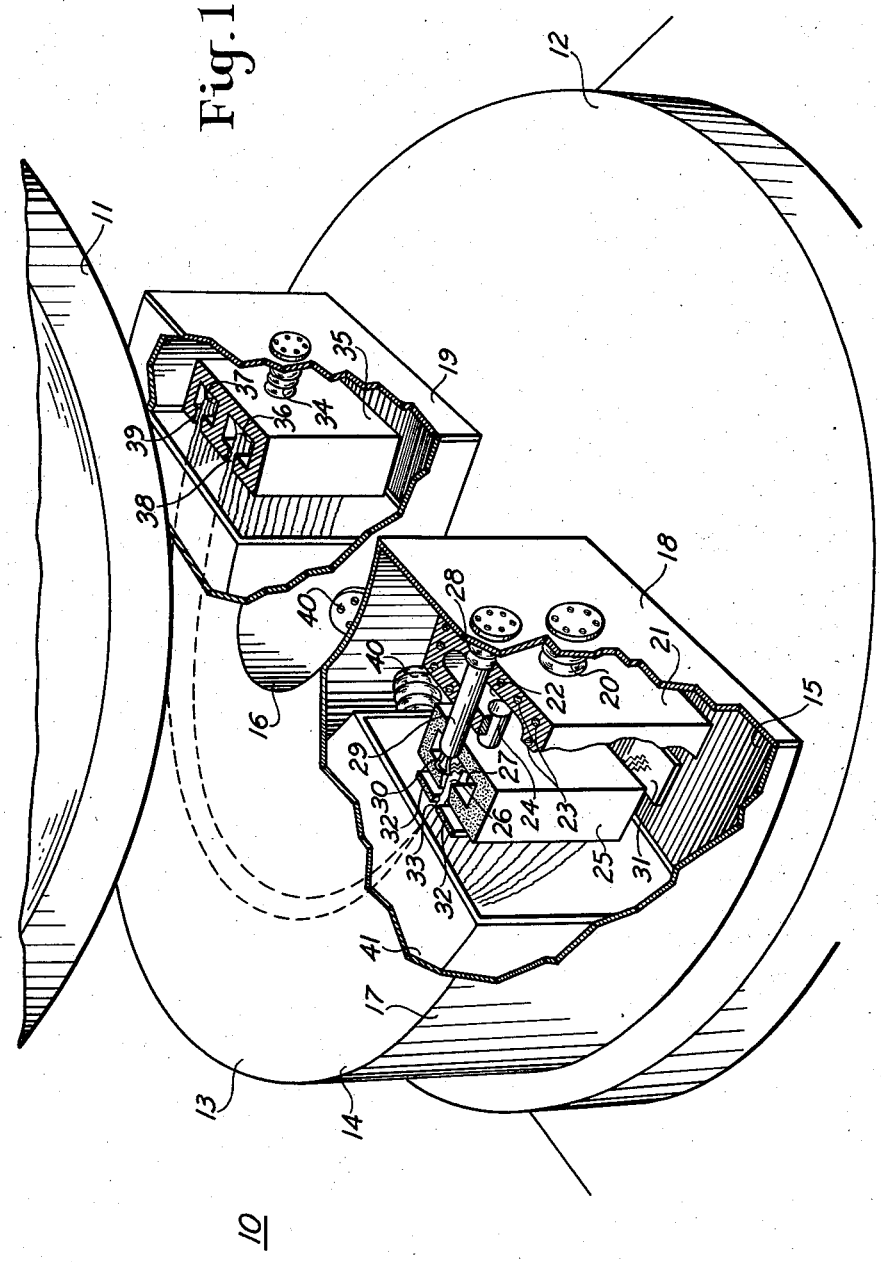
Figure 2:
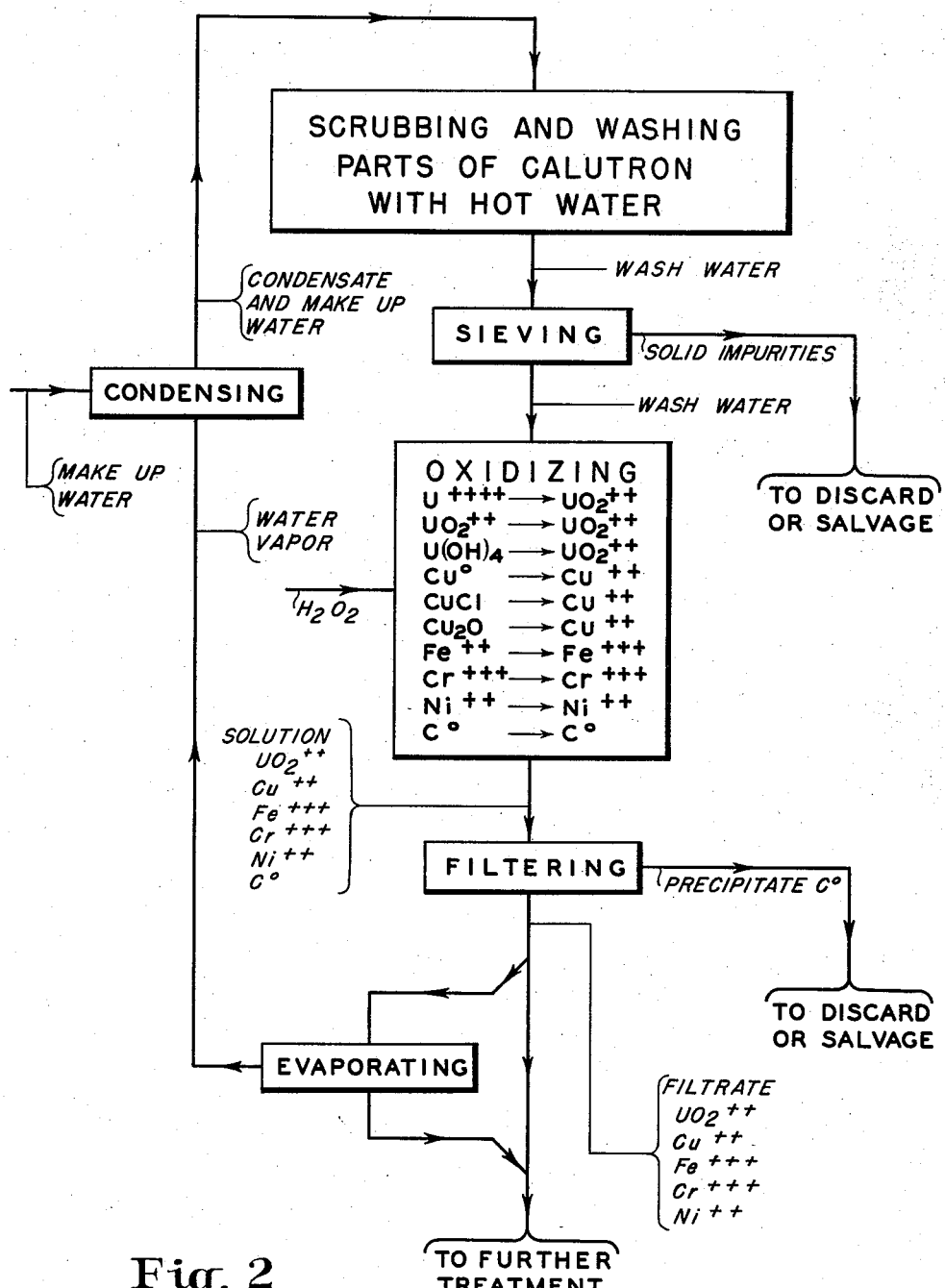
Figure 3:
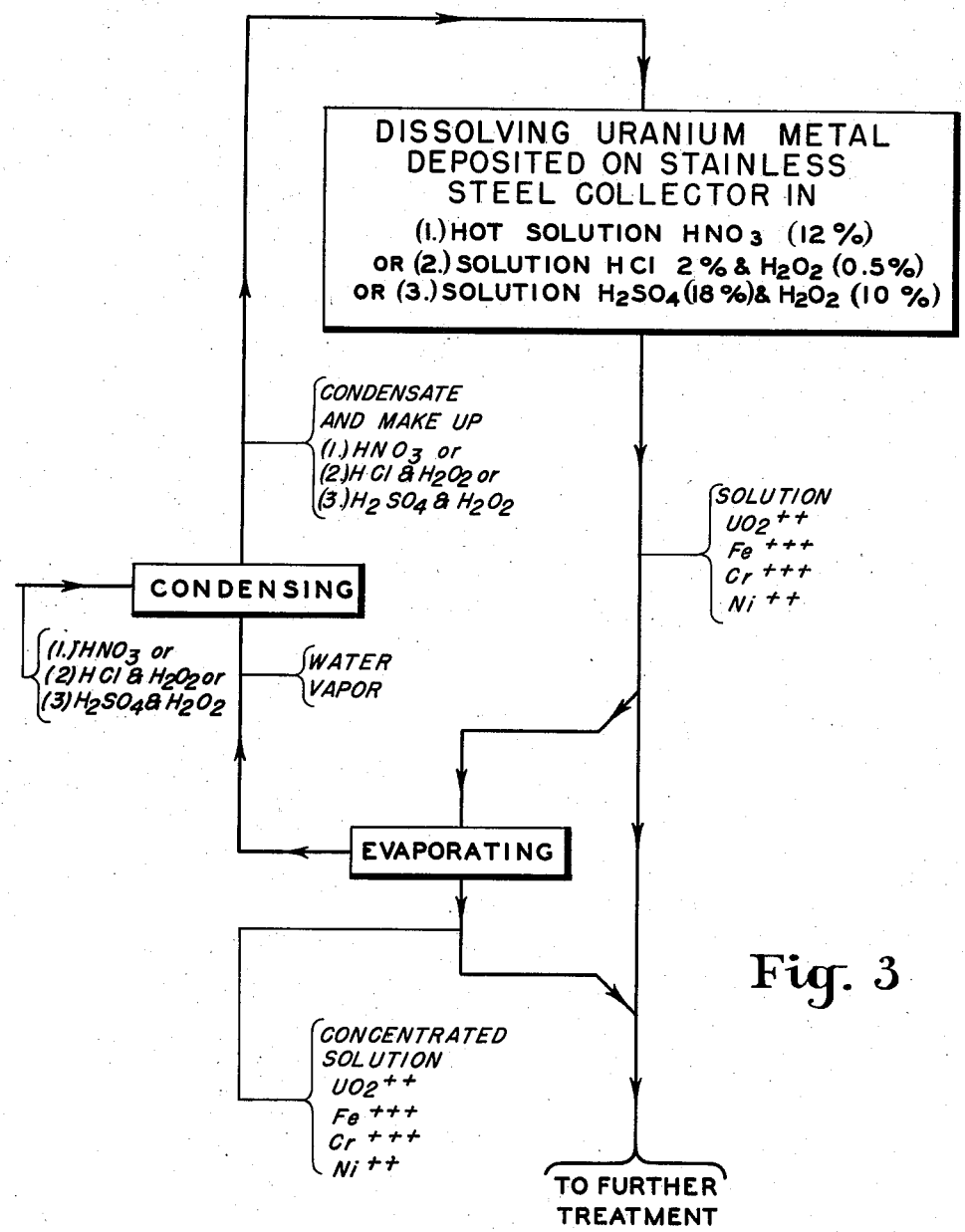
Figure 4:
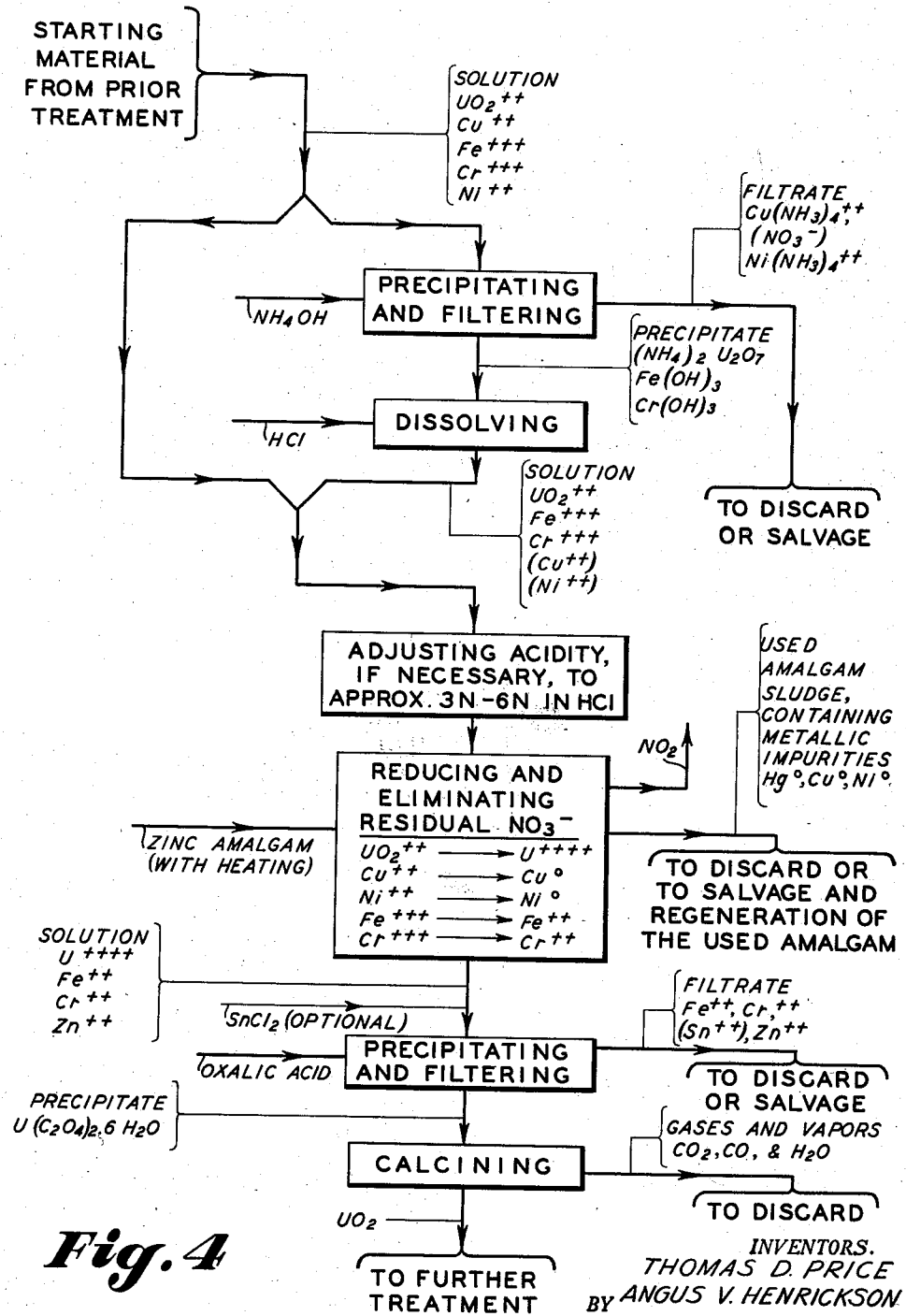
Figure 5:
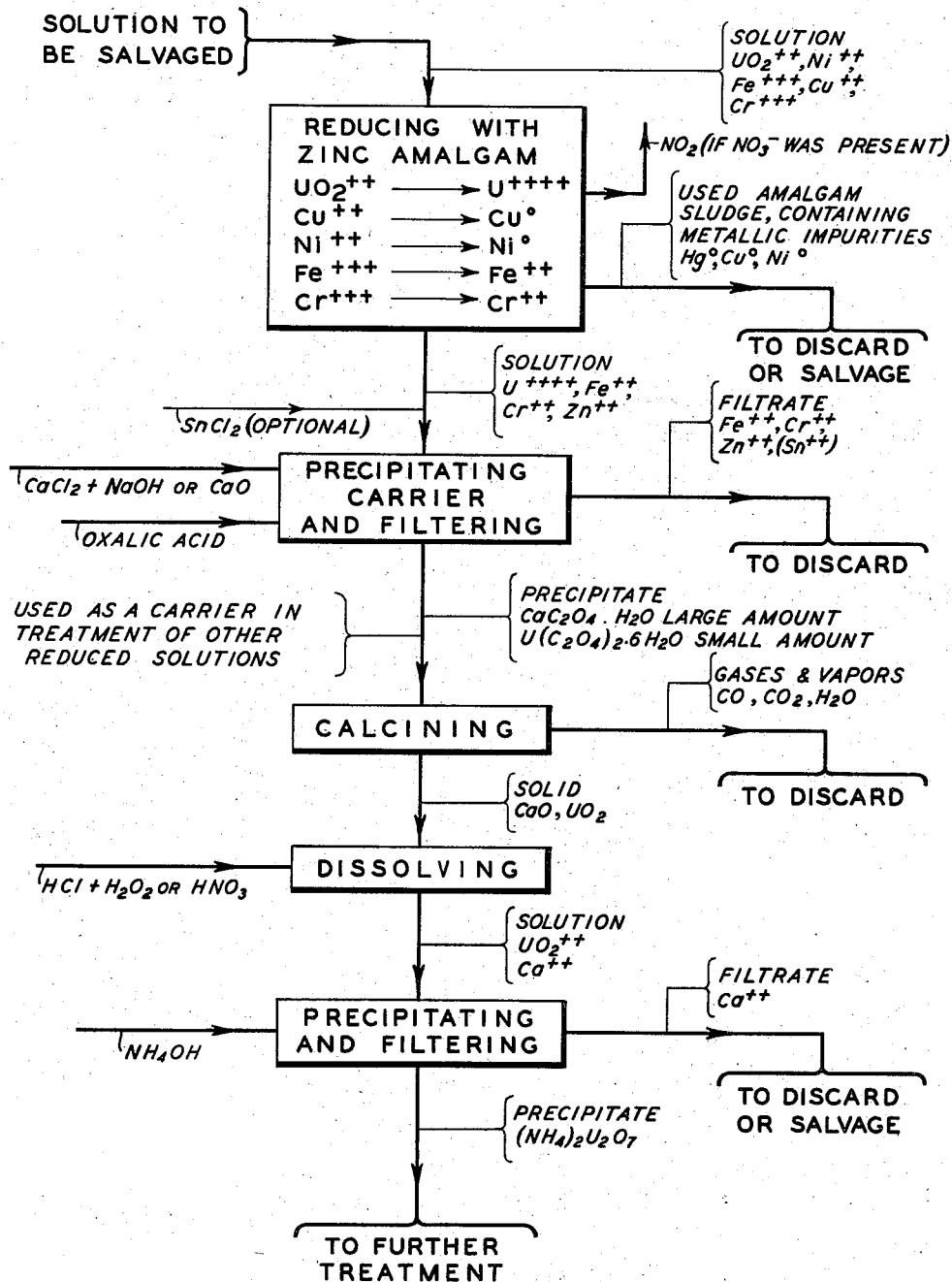
Figure 6:
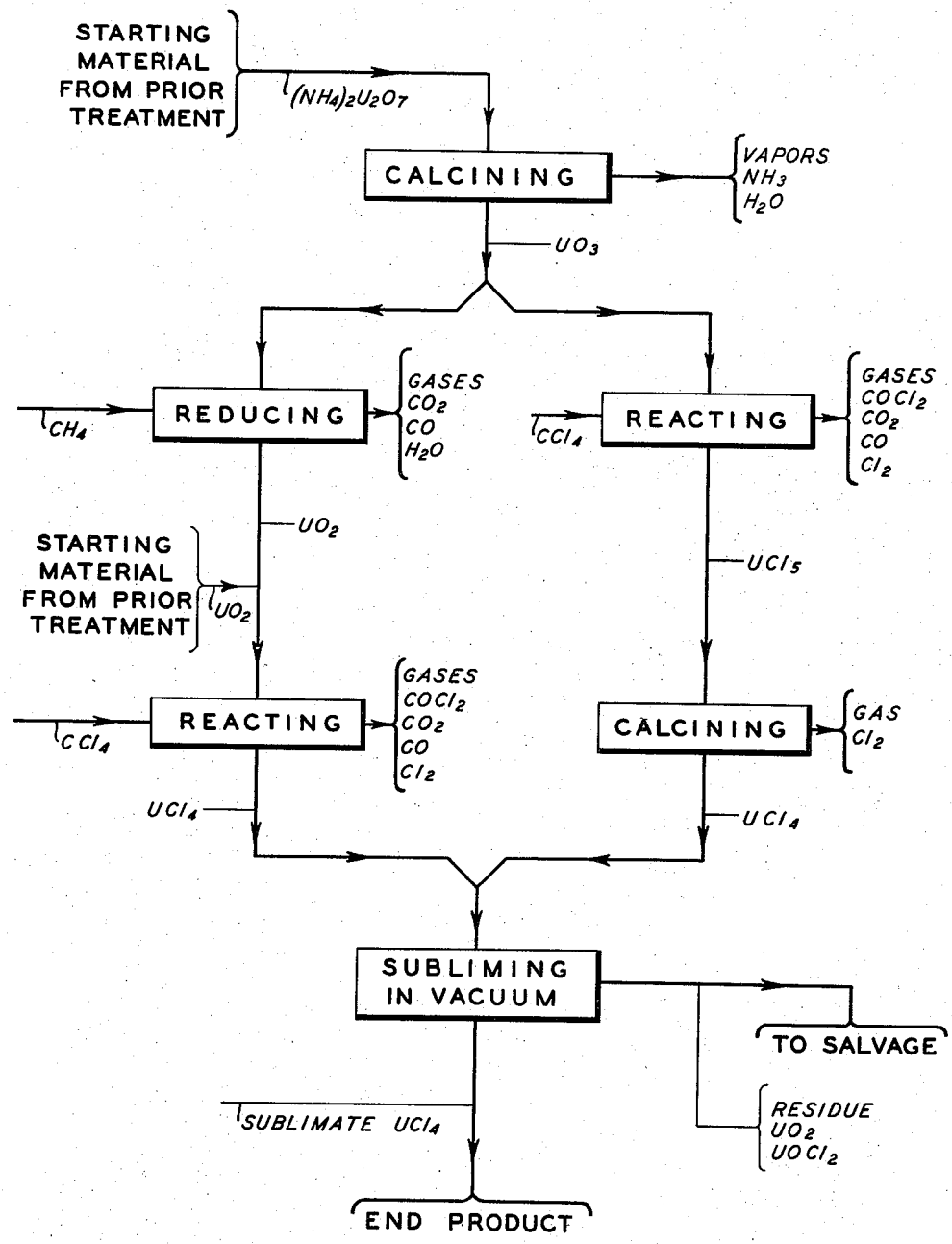

The invention both as to its organization and method of operation, together with further objects and advantages thereof, will best be understood by reference to the following specification taken in connection with the accompanying drawings, in which Figure 1 is a perspective view, partly broken away, of a calutron in conjunction with which there may be carried out the process of the present invention; Fig. 2 illustrates a portion of the flow diagram of the present process, indicating the recovery of the residue of $UCl_4$ from the parts of the calutron disposed in the source region thereof upon which it is deposited; Fig. 3 illustrates another portion of the flow diagram of the present process, indicating the recovery of the metallic uranium from the collector of the calutron upon which it is deposited; Fig. 4 illustrates a further portion of the flow diagram of the present process, indicating the purification of the recovered uranium; Fig. 5 illustrates a further portion of the flow diagram of the present process, indicating the salvage of a fraction of uranium contained in materials which have been previously subjected to primary uranium recovery treatment; and Fig. 6 illustrates a still further portion of the flow diagram of the present process, indicating the ultimate conversion of the purified uranium back to $UCl_4$.

At the outset, it is noted that a "calutron" is a machine of the character of that disclosed in the copending aplication of Ernest O. Lawrence, Serial No. 557,785, filed October 9, 1944, which issued as Patent No. 2,709,222 on May 24, 1955, and is employed to separate the constituent isotopes of an element and more particularly to increase the proportion of a selected isotope in an element containing several isotopes in order to produce the element enriched with the selected isotope. For example, the machine is especially useful in producing uranium enriched with $U^{235}$.

Such a calutron essentially comprises means for vaporizing a quantity of material containing an element which is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

Referring now more particularly to Fig. 1 there is illustrated a representative example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally projecting cathode structure 29, including a filamentary cathode 30 adapted to be connected to a suitable source of current. The cathode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelerating structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries an insulator 34 which supports an upstanding collector block 35 formed of stainless steel or the like and provided with two laterally spaced-apart cavities or pockets 36 and 37 which communicate with aligned slots 38 and 39 formed in the wall of the collector block 35 disposed remote from the removable end wall 19. Alternatively, the collector block may be fabricated of steel plate and the inner surfaces of the pockets 36 and 37 lined with stainless steel plates. It is noted that the pockets 36 and 37 are adapted to receive two constituent isotopes of an element which have been separated in the calutron 10, as explained more fully hereinafter. Finally, the inner wall 16 carries a number of insulators 40 which support a tubular liner 41 formed of copper or the like, rectangular in vertical cross-section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated by the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high-velocity positive ions, disposed between the plates 32 and the collector block 35 within the tubular liner 41. The high-velocity positive ions entering the adjacent end of the liner 41 are deflected from their normal straight-line path and from a vertical plane passing through the slot 26 and the slit 33, due to the effect of the relatively strong magnetic field maintained through the space within the tank 13 and the liner 41 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 38 into the pocket 36 formed in the collector block 35; whereas ions of the relatively heavy isotope of the element describe an exterior arc of relatively long radius and are focused through the slot 39 into the pocket 37 formed in the collector block 35. Accordingly, the ions of the relatively light isotope of the element are collected in the pocket 36 and are de-ionized to produce a deposit of the relatively light isotope of the element therein, while the ions of the relatively heavy isotope of the element are collected in the pocket 37 and are deionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotopes of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection, reference is again made to the copending application of Ernest O. Lawrence for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge block 21 is $UCl_4$, as this compound may be readily vaporized and the molecular form of the vapor may be readily broken up to form positive ions of uranium with great facility. In this case, uranium enriched with $U^{235}$ is collected in the pocket 36 of the collector block 35, and uranium comprising principally $U^{238}$ is collected in the pocket 37 of the collector block 35. Also, it is noted that from a practical standpoint, the deposit of uranium collected in the pocket 36 of the collector block 35 contains considerable amounts of $U^{238}$, in view of the fact that this isotope comprises the dominant constituent of ordinary uranium. Furthermore, the deposit of uranium collected in the pocket 36 of the collector block 35 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 36 of the collector block 35 is considerably enriched, both with $U^{234}$ and $U^{235}$, and considerably impoverished with respect to $U^{238}$ as compared to natural or normal uranium.

During the operation of the calutron 10 in the production of uranium enriched with $U^{235}$, the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being un-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$. Of these atomic and molecular ions only the singly ionized atomic ions $U^+$ have the required ratio between mass and charge such that they are focused through the slots 38 and 39 into the pockets 36 and 37 formed in the collector block 35; the atomic ions $U^+$ of masses 234 and 235 focusing through the slot 38 into the pocket 36, and the atomic ions $U^+$ of mass 238 focusing through the slot 39 into the pocket 37, as previously noted.

The doubly ionized atomic ions $U^{++}$ have such a ratio between mass and charge that they are deflected along an arc of shorter radius into engagement with the inner wall of the liner 41, where they are de-ionized to form a deposit thereon. The singly and doubly ionized atomic ions $Cl^+$ and $Cl^{++}$ and the singly and doubly ionized molecular ions $Cl_2^+$ and $Cl_2^{++}$ have such small ratios between mass and charge that they are deflected along arcs of very short radii into engagement with the inner wall of the liner 41 adjacent the source region, where they are de-ionized to form neutral chlorine molecules, which gas is subsequently pumped from the tank 13 due to the operation of the vacuum pumping apparatus previously noted. Similarly, the doubly ionized molecular ions $UCl_4^{++}$, $UCl_3^{++}$, $UCl_2^{++}$ and $UCl^{++}$ have intermediate ratios between mass and charge such that they are deflected along arcs of intermediate radii into engagement with the inner wall of the liner 41 intermediate the source region and the collector region, where they are de-ionized to form a deposit thereon. Finally, the singly ionized molecular ions $UCl_4^+$, $UCl_3^+$, $UCl_2^+$ and $UCl^+$ have large ratios between mass and charge, such that they are deflected along arcs of large radii into engagement with the outer wall of the liner 41 intermediate the source region and the collector region, where they are de-ionized to form a deposit thereon.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41. These deposits represent uranium which contains the various isotopes $U^{238}$, $U^{235}$ and $U^{234}$ in natural or normal amounts such that these deposits should be recovered for recycling purposes as well as to clean the liner 41 and the other parts of the calutron 10 in order to insure efficient operation thereof.

Considering the present process in greater detail with reference to the production of uranium enriched with $U^{235}$, it is pointed out that natural or normal uranium comprises three isotopes, $U^{238}$, $U^{235}$ and $U^{234}$, in the approximate relative abundances 1, $\frac{1}{139}$ and $\frac{1}{16,700}$ (in numbers of atoms with reference to $U^{238}$), respectively, or approximately 16,700, 120 and 1 atoms, respectively, in 16,821 atoms of a sample. It is highly desirable to prepare large quantities of uranium enriched with the thermal-neutron fissionable isotope $U^{235}$ for commercial purposes, and it has been found that this end can be accomplished by employing the calutron method. However, it is desirable that the uranium product have an enrichment factor with respect to $U^{235}$ of the order of 400, this factor being defined as the quotient obtained by dividing the ratio of $U^{235}$ to $U^{238}$ in the product by the ratio of $U^{235}$ to $U^{238}$ in the original material. Now assuming that the product is enriched by 400 in both $U^{235}$ and $U^{234}$, it comprises $U^{238}$, $U^{235}$ and $U^{234}$ in the approximate relative abundances 1, $\frac{400}{139}$ and $\frac{400}{16,700}$ (in numbers of atoms with reference to $U^{238}$), respectively, or approximately 16,700, 48,057 and 400 atoms, respectively in 65,157 atoms of a sample. Thus the enriched uranium product comprises approximately 25.7% $U^{238}$, 73.7% $U^{235}$ and 0.6% $U^{234}$.

In order to obtain this desired enrichment of the uranium product by utilizing the calutron method, it has been found most convenient to use first-stage and second-stage calutrons, the first-stage calutrons employing natural or normal uranium and producing a first-stage enriched product having an enrichment factor of the order of 20 with respect to natural or normal uranium; and the second-stage calutrons employing first-stage enriched uranium and producing a second-stage enriched product having an enrichment factor of the order of 20 with respect to the first-stage enriched uranium, whereby the second-stage enriched uranium product has a final enrichment factor of the order of 400 with respect to natural or normal uranium. By employing the present process, whereby the ultimate enrichment of the final uranium product is obtained in two stages, as indicated above, each of the first-stage and the second-stage calutrons may be operated in the stable range and to give a maximum yield or enriched material.

Accordingly, in the present process it will be understood that in the event the calutron 10 comprises a first-stage calutron, the deposit of uranium in the pocket 37 in the collector block 35 has been improverished with respect to the desired isotope $U^{235}$, and is recovered therefrom and discarded; while the deposit of uranium in the pocket 36 in the collector block 35 has been singly enriched with respect to the desired isotope $U^{235}$, and is recovered therefrom and subsequently treated in a second-stage calutron. On the other hand, in the event the calutron 10 comprises a second-stage calutron, the deposit of uranium in the pocket 37 in the collector block 35 has been first enriched and then improverished with respect to the desired isotope $U^{235}$, and is recovered therefrom and analyzed for $U^{235}$ content to determine its suitability for possible recycling in a first-stage calutron; while the deposit of uranium in the pocket 36 in the collector block 35 has been doubly enriched with respect to the desired isotope $U^{235}$, and is recovered therefrom for commercial use.

Thus it will be understood that in a first-stage calutron, the deposit of metallic uranium in the pocket 36 in the collector block 35 has been subjected to one treatment and is termed "singly enriched" uranium, the enrichment being with respect to the desired isotope, $U^{235}$; on the other hand, in a second-stage calutron the deposit of metallic uranium in the pocket 36 in the collector block 35 has been subjected to two treatments, and is termed "doubly enriched" uranium, the enrichment being with respect to the desired isotope $U^{235}$.

Considering now the present process in greater detail, it will be understood that a plant arranged to carry out the process will comprise a relatively large number of first-stage calutrons and a relatively small number of second-stage calutrons, in addition to facilities for handling, storing, recovering, purifying and converting the various metallic and compound forms of uranium. The starting material employed as a charge in the first-stage calutron is $UCl_4$, comprising natural or normal uranium, whereby metallic uranium singly enriched with $U^{235}$ is deposited in the first pocket of the collector and metallic uranium impoverished with respect to $U^{235}$ is deposited in the second pocket of the collector. Also, a large amount of $UCl_4$ is deposited as a residue upon the parts of the first-stage calutron disposed in the source region thereof, the deposit being primarily on the source-region end of the liner. After several charges of $UCl_4$, comprising natural or normal uranium, have been employed in the first-stage calutron, reasonable deposits of metallic uranium have been collected in the first and and second pockets of the collector, and the metallic uranium deposits in the collector and the $UCl_4$ residue on the liner are recovered.

More particularly, the metallic uranium singly enriched with $U^{235}$ and deposited in the first pocket of the collector is recovered by an acid wash process, whereby various impurities including iron, chromium and nickel are introduced in the wash solution, due to the fact that the collector of the first-stage calutron which is thus washed with acid is formed of the metals mentioned. Accordingly, the wash solution containing the uranium single enriched with $U^{235}$ which has been reclaimed contains considerable impurities. This wash solution is stored and subsequently employed as makeup material in a purification process utilized in conjunction with the second-stage calutron, in a manner more fully explained hereinafter. The metallic uranium improverished with respect to $U^{235}$ and deposited in the second pocket of the collector is recovered by an acid wash process and discarded, as it contains so little $U^{235}$ that further processing thereof is not feasible.

The residue of $UCl_4$ deposited on the parts of the first-stage calutron disposed in the source region thereof, principally upon the liner, is recovered by a water wash process, whereby various impurities including copper, iron, chromium, nickel and carbon are introduced in the wash solution, due to the fact that the various parts of the first-stage calutron which are thus washed with water are formed of the materials mentioned. Accordingly, the wash solution containing natural or normal uranium which has been reclaimed, contains considerable impurities. To this wash solution there is added makeup material in the form of a wash solution derived from the second-stage calutron, and comprising the wash solution from the second pocket of the collector, and containing uranium which has been first enriched with $U^{235}$ in the first-stage calutron and subsequently impoverished with respect to $U^{235}$ in the second-stage calutron, as explained more fully hereinafter. This composite wash solution is then purified in order to eliminate the impurities mentioned; the impurities thus eliminated are discarded; and the uranium thus purified is then converted back to the compound $UCl_4$. This compound of $UCl_4$ is then employed, along with a suitable amount of makeup $UCl_4$, as a charge in the first-stage calutron.

Accordingly, the residue of $UCl_4$ deposited in the source region of the first-stage calutron is treated to render it recyclable therein; the first-stage enriched uranium is stored for use in the second-stage calutron; and the first-stage improverished uranium is discarded.

The starting material employed as a charge in the second-stage calutron is $UCl_4$, comprising single enriched uranium, whereby metallic uranium doubly enriched with $U^{235}$ is deposited in the first pocket of the collector and metallic uranium which has been first enriched in the first-stage calutron and then impoverished in the second-stage calutron is deposited in the second pocket of the collector. Also, a large amount of $UCl_4$ is deposited as a residue upon the parts of the second-stage calutron disposed in the source region thereof, the deposit being primarily on the source-region end of the liner. After several charges of $UCl_4$ comprising singly enriched uranium have been employed in the second-stage calutron, resonable deposits of metallic uranium have been collected in the first and second pockets of the collector, and the metallic uranium deposits in the collector and the $UCl_4$ residue on the liner are recovered.

More particularly, the metallic uranium doubly enriched with $U^{235}$ and deposited in the first pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium doubly enriched with $U^{235}$ which has been reclaimed contains considerable impurities. This wash solution is then purified in order to eliminate the impurities mentioned; the impurities thus eliminated are discarded or salvaged; and the uranium thus purified is converted into a standard compound of uranium for commercial use. The metallic uranium first enriched with $U^{235}$ and subsequently impoverished with respect to $U^{235}$ and deposited in the second pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium first enriched with $U^{235}$ and subsequently impoverished with respect to $U^{235}$ which has been reclaimed contains considerable impurities. The uranium in the wash solution is then analyzed, and in the event it contains at least as much $U^{235}$ as natural or normal uranium, it is employed as makeup material in the purification process utilized in conjunction with the first-stage calutron.

The residue of $UCl_4$ deposited on the parts of the second-stage calutron disposed in the source region thereof, principally upon the liner, is recovered by a water wash process, whereby various impurities including copper, iron, chromium, nickel and carbon are introduced in the wash solution due to the fact that the various parts of the second-stage calutron which are thus washed with water are formed of the materials mentioned. Accordingly, the wash solution containing the singly enriched uranium which has been reclaimed contains considerable impurities. To this wash solution there is added the previously stored makeup material in the form of the wash solution derived from the first-stage calutron and comprising the acid wash solution from the first pocket of the collector of the first-stage calutron and containing singly enriched uranium. This composite wash solution is then purified in order to eliminate the impurities mentioned; the impurities thus eliminated are discarded or salvaged; and the uranium thus purified is then converted back to the compound $UCl_4$. This compound of $UCl_4$ is then employed as a charge in the second-stage calutron.

Accordingly, the residue of $UCl_4$ deposited in the source region of the second-stage calutron is treated to render it re-cyclable therein; the second-stage enriched uranium is converted to a standard compound of uranium to be used commercially; and the second-stage impoverished uranium is stored for use in the first-stage calutron.

Considering now the details of the recovery of the $UCl_4$ residue from the parts of either a first-stage or a second-stage calutron disposed in the source region thereof, reference is made to the portion of the flow diagram illustrated in Fig. 2. The parts of the calutron disposed in the source region thereof, principally the source-region end of the liner, are scrubbed and washed with hot water, whereby the residue of $UCl_4$ deposited thereon is dissolved; and various impurities including copper, iron, chromium, nickel and carbon, are introduced in the water wash, due to the fact that the various parts of the calutron which are thus washed with hot water are formed of the materials mentioned. The wash water is then sieved in order to remove any solid impurities which may be picked up, such, for example, as small pieces of metal and carbon. These solid impurities may be either discarded or subjected to salvage treatment in order to recover any occluded uranium. The sieved wash water is then treated with an oxidizing agent such as $H_2O_2$ by adding a slight excess of ten percent $H_2O_2$ and agitating the solution in order to oxidize the various contained materials. For example, the wash water prior to the step of oxidation may contain suspended $U(OH)_4$ and bits of copper and carbon, dissolved uranium in the $+4$ and $+6$ valence states, as well as dissolved copper, iron, nickel, chromium and possibly other metals in one or more of the positive valence states. Hence, as a result of the oxidation all of the uranium is put in solution as uranyl ion, suspended copper is put in solution as cupric ion, and other dissolved materials are put in their higher stable valence states, if they are not already in such state. Carbon is not oxidized by this treatment. The effect of the oxidation on the various materials contained in the wash solution may be indicated as follows:

$$U^{++++} \rightarrow UO_2^{++}$$
$$UO_2^{++} \rightarrow UO_2^{++}$$
$$U(OH)_4 \rightarrow UO_2^{++}$$
$$Cu^0 \rightarrow Cu^{++}$$
$$CuCl \rightarrow Cu^{++}$$
$$Cu_2O \rightarrow Cu^{++}$$
$$Fe^{++} \rightarrow Fe^{+++}$$
$$Cr^{+++} \rightarrow Cr^{+++}$$
$$Ni^{++} \rightarrow Ni^{++}$$
$$C^0 \rightarrow C^0$$

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise, this step is omitted. In the event the filtrate is concentrated by evaporation, the water vapor which is driven off is condensed and to it is added enough makeup water in order to provide a new wash solution, which is used again to wash the parts of the calutron disposed in the source region thereof, in the manner previously explained. This step, comprising condensing and reusing the water vapor which is driven off the filtrate incident to concentration by evaporation, is advantageous in view of the fact that any uranium entrained in the water vapor is not lost. The original filtrate mentioned above, or the concentrated filtrate following evaporation, in the event this step is employed, is then stored for further treatment.

It will be understood that the stored water wash derived from the parts of the first-stage calutron disposed in the source region thereof, as explained above, comprises uranium of natural or normal composition with reference to $U^{235}$; while the stored water wash derived from the parts of the second-stage calutron disposed in the source region thereof, as explained above, comprises uranium which is singly enriched with $U^{235}$.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, reference is made to the portion of the flow diagram illustrated in Fig. 3. The inner surfaces of the first pocket of the collector of the calutron are etched with one of a number of acid solutions, whereby the deposit of metallic uranium, either singly or doubly enriched with $U^{235}$, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$.

A suitable acid wash solution which may be employed for the purpose mentioned comprises an aqueous solution containing $HNO_3$ (approximately 12%). Another suitable acid wash solution comprises an aqueous solution containing $HCl$ (approximately 2%) and $H_2O_2$ (approximately 0.5%). A further suitable acid wash solution comprises an aqueous solution containing $H_2SO_4$ (approximately 18%) and $H_2O_2$ (approximately 10%). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or $HCl$ and $H_2O_2$, or $H_2SO_4$ and $H_2O_2$, depending upon the composition of the original wash acid employed, in order to provide a new wash acid which is again used to wash the first pocket of the collector of the calutron, in the manner previously explained. This step, comprising condensing the vapor which is driven off the wash acid incident to concentration by evaporation, is advatageous in view of the fact that any uranium entrained in the vapor is not lost to the outside. The original wash acid mentioned above, or the concentrated wash acid following evaporation, in the event this step is employed, is then stored for further treatment.

It will be understood that the stored acid wash derived from the first pocket of the collector of the first-stage calutron, as explained above, comprises uranium which is singly enriched with $U^{235}$; while the stored acid wash derived from the first pocket of the collector of the second-stage calutron, as explained above, comprises uranium which is doubly enriched with $U^{235}$.

The metallic uranium, impoverished with respect to $U^{235}$ and deposited in the second pocket of the collector of the first-stage calutron, may be recovered merely by etching the inner surfaces of the second pocket of this collector with a suitable wash acid of the character mentioned above, whereby this deposit of metallic uranium is dissolved. This acid wash is then discarded, as it contain so little $U^{235}$ that further processing thereof is not feasible.

On the other hand, the metallic uranium which has been first enriched with respect to $U^{235}$ and subsequently impoverished with respect to $U^{235}$, and deposited in the second pocket of the collector of the second-stage calutron, may be recovered by etching the inner surfaces of the second pocket of this collector with a suitable wash acid of the character mentioned above, whereby this deposit of metallic uranium is dissolved; and various impurities, including iron, chromium and nickel are introduced in the acid wash solution, due to the fact that the inner surfaces of the second pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$. The considerations concerning whether the wash acid should be concentrated the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is stored for further treatment; on the other hand, in the event the analysis indicates that the $U^{235}$ content of this wash acid is less than that of natural or normal uranium, it is discarded, as further processing thereof is not feasible.

To the stored water wash solution derived from the parts of the first-stage calutron disposed in the source region thereof, there is added the stored acid wash solution derived from the second pocket of the collector of the second-stage calutron in order to produce a first composite solution; this first composite solution comprises uranium of substantially natural or normal composition with reference to $U^{235}$. Also, to the stored water wash solution derived from the parts of the second-stage calutron disposed in the source region thereof, there is added the stored acid wash solution derived from the first pocket of the collector of the first-stage calutron in order to produce a second composite solution; this second composite solution comprises uranium which is singly enriched with $U^{235}$. Finally, the stored acid wash solution derived from the first pocket of the collector of the second-stage calutron constitutes a third composite solution; this third composite solution comprises uranium which is doubly enriched with $U^{235}$.

Considering now the details of the purification of one of the composite solutions described above comprising the following ions: $UO_2^{++}$, $Cu^{++}$, $Fe^{+++}$, $Cr^{+++}$ and $Ni^{++}$, reference is made to the portion of the flow diagram illustrated in Fig. 4. In the event that the solution contains a reasonably large amount of copper and nickel, or if it contains a substantial amount of $NO_3^-$, the solution is subjected to a preliminary ammonia treatment for the elimination of a majority, if not substantially all, of the copper and nickel impurities, as well as for the separation of uranium and substantially all of the original $NO_3^-$ content, or both, as the case might be; otherwise this preliminary step may be omitted. Assuming that the ammonia treatment is to be employed, the solution is treated with excess ammonia, which may be in the form of $NH_3$ gas or carbonate-free $NH_4OH$, whereby $(NH_4)_2U_2O_7$, $Fe(OH)_3$ and $Cr(OH)_3$ are precipitated away from $NO_3^-$, if present, and from most of the copper and nickel impurities that remain in solution in the form of ammonio complex ions, $Cu(NH_3)_4^{++}$ and $$Ni(NH_3)_4^{++}$$

The solution is then filtered and the precipitate, consisting of ammonium diuranate, ferric hydroxide and chromic hydroxide, is washed with water containing about 1 percent $NH_4OH$ and 1 percent $NH_4Cl$ in order to eliminate occluded copper- and nickel-ammonio complex ions, as well as occluded nitrate ions. The filtrate containing the copper- and nickel-ammonio complex ions, as well as the nitrate ion, is then discarded or subjected to salvage treatment in order to recover any uranium contained therein, and the initially purified precipitate of $(NH_4)_2U_2O_7$, $Fe(OH)_3$ and $Cr(OH)_3$ is dissolved in dilute HCl, whereby a solution is obtained containing the following ions: $UO_2^{++}$, $Fe^{+++}$ and $Cr^{+++}$, and with or without traces of one or more of the following ions: $Cu^{++}$, $Ni^{++}$ and $NO_3^-$.

The original composite solution (in case that solution contains a sufficiently low concentration of copper and nickel impurities, and/or in case it contains substantially no nitrate ion, thereby rendering it unnecessary to subject it to the preliminary ammonia treatment just described), or the solution obtained after the preliminary ammonia treatment described above, is then treated with hydrochloric acid in an amount and concentration sufficient to bring the solution to an acidity corresponding to a range of approximately 3 N to 6 N in HCl, and preferably at least approximately 5 N. At this point there is obtained a solution containing $UO_2^{++}$ together with varying amounts of metallic impurities in ionic form, such as $Cu^{++}$, $Ni^{++}$, $Cr^{+++}$ and $Fe^{+++}$, which solution has been adjusted to approximately 3 N to 6 N in HCl and which is relatively (although not necessarily completely) free from $NO_3^-$, either by reason of having been derived from solutions by procedures wherein the use of $HNO_3$ has been avoided, or (in cases where $HNO_3$ has been employed at some prior step of the process) where any contained $NO_3^-$ has been substantially completely eliminated preliminarily in the manner indicated above.

In any case, the acidified solution so obtained is then subjected to the reducing action of a liquid amalgam, such as zinc amalgam, that has been previously prepared in any desired manner. For example, a 3 percent zinc amalgam is eminently satisfactory for the purpose, and may be prepared by boiling a quantity of mercury with approximately 3 percent of its weight of zinc in the presence of a relatively small amount of hydrochloric acid to promote the amalgamating reaction.

The acidified solution to be reduced is admixed with the zinc amalgam and intimate contact between the two phases is then brought about, such as by shaking or otherwise vigorously agitating the whole. Meanwhile the entire mixture is heated to a temperature approaching or at the boiling point of the solution in order to hasten the reduction. The time required for the reduction is not particularly critical, provided care is taken to afford sufficient time for reasonably complete reduction, under given conditions of temperature, degree of agitation, etc. As a result of this treatment, any residual $NO_3^-$ that might still remain in the solution is destroyed during the process, the reaction products thereof being removed in the form of gaseous oxides of nitrogen, such as $NO_2$, while the metal components present in the solution are reduced to lower valence states. Thus, $UO_2^{++}$ is reduced to $U^{++++}$; $Cu^{++}$ is reduced to the metallic state, $Cu^0$; $Ni^{++}$ is reduced to the metallic state, $Ni^0$; $Fe^{+++}$ is reduced to $Fe^{++}$, and $Cr^{+++}$ is reduced to $Cr^{++}$.

There is reason to believe that a reduction of a portion of the uranium content all the way to $U^{+++}$ may take place; however, since any trivalent uranium so formed is readily converted to tetravalent uranium by oxalic acid during the subsequent oxalate separation procedure (so that $U^{+++}$, if present, does not interfere in any way with the ultimate recovery of the uranium), it is sufficient for all practical purposes to regard the reduction step herein described as converting $UO_2^{++}$ to $U^{++++}$ exclusively. In fact, the formation of some $U^{+++}$ during the course of the reduction may be advantageous for at least two reasons: (a) the presence of $U^{+++}$ ions tends to "buffer" the solution against undesired reoxidation of $U^{++++}$ to $UO_2^{++}$ such as by air, and (b) the formation of $U^{+++}$ ions (which by themselves impart a characteristic red color to solutions) changes the characteristic green of tetravalent uranium-containing solutions to a brown or reddish-brown, depending upon the extent of reduction, and hence affords a convenient way of judging the appropriate time for terminating the reduction treatment.

The degree and manner of reduction which takes place in any given instance is in part dependent upon the amount of zinc or other liquid amalgam that is employed, relative to the amount of solution undergoing treatment and the cation content thereof. The amalgam is employed in amount sufficient to provide zinc or other metal in excess relative not only to the uranium content of the solution undergoing treatment, but also with respect to its content of any other ions that are more readily reducible than is $UO_2^{++}$ under the conditions obtaining, such as $Fe^{+++}$ and residual $NO_3^-$, and preferably in excess relative to the entire metal ion and $NO_3^-$ content of the solution.

Metal impurities such as copper and nickel that are reduced to the metallic state as a result of this treatment are readily removed from the system in association with the spent liquid amalgam sludge, and the latter may be discarded or subjected to salvage and the spent amalgam regenerated for reuse. The spent amalgam may be filtered to separate the metal impurities that are present therein in the solid state, and the filtrate comprising mercury then incorporated with further quantities of metallic zinc (or other metal capable of amalgam formation) to form a regenerated amalgam that may be recycled to the reactor wherein reduction of the uranium-containing solution takes place. From time to time, as the concentration of dissolved metal impurities in the recycled amalgam, i.e., the impurities not separated by filtration, builds up to an objectionable degree, the mercury-containing filtrate from the spent-amalgam filtering operation may be sent to a suitably heated still, and purified mercury vapor taken overhead, condensed and returned to the system for reuse, while the non-volatile metal impurities from the still are discarded or subjected to salvage operations as desired.

Returning now to the reduced solution obtained as a result of the zinc amalgam reduction step, this solution comprises the following ions: $U^{++++}$, $Zn^{++}$ (introduced into the solution as a result of the reducing action of the metallic zinc, which in turn is oxidized to $Zn^{++}$), $Fe^{++}$ and $Cr^{++}$.

Before further treatment of this reduced solution it is frequently found desirable to protect it further against oxidative influences such as exposure to air, inadvertent or otherwise, by adding thereto a minor amount of a suitable reducing agent. Stannous chloride is well adapted for this purpose, and may be added in the form of a saturated solution of the freshly prepared salt, preferably in an amount sufficient to provide $Sn^{++}$ substantially in excess relative to the uranium content of the solution undergoing treatment. Of course, where the succeeding step is to follow without undue delay, or where the risk of loss of a portion of the uranium can be tolerated, the step of adding the protecting (reducing) agent to the solution need not be resorted to.

The reduced solution, with or without the added reducing agent, is then treated with an excess of oxalic acid, whereby $U(C_2O_4)_2 \cdot 6H_2O$ is precipitated away from the iron, chromium and zinc impurities in the solution. If stannous chloride is present, the added tin impurity likewise remains in solution. More specifically, the oxalic acid produces uranous oxalate which is extremely insoluble in the acid solution, while the metal impurities, including iron, chromium, zinc and tin, if present, do not form insoluble compounds under the conditions obtaining, and hence remain in solution, apparently in the form of their simple cations as shown in the drawing.

The precipitation of uranium as uranous oxalate away from the metal impurities in the solution is most advantageously effected when the reduced solution is about 3 N to 6 N in HCl, and if necessary the reduced solution is adjusted to that acidity prior to the uranous oxalate precipitation step.

The solution is then filtered and the uranous oxalate precipitate is washed with a dilute oxalic acid or oxalic acid-hydrochloric acid solution in order to carry into the filtrate any slight metal impurities occluded by the precipitate. The filtrate containing the $Fe^{++}$, $Cr^{++}$ and $Zn^{++}$ ions (and $Sn^{++}$, if tin was present) is then discarded or subjected to salvage treatment in order to recover any uranium contained therein. The $U(C_2O_4)_2 \cdot 6H_2O$ precipitate is then calcined in a non-oxidizing atmosphere, such as nitrogen or hydrogen, at about 500° C. in order to produce $UO_2$, whereby $CO_2$ and $CO$ gases and water vapor are given off incident to the calcination. The uranium thus purified, and in the compound form $UO_2$, is then stored for further treatment or commercial use, as previously noted.

It will be understood that the purification of the first composite solution in the manner described above is productive of a first batch of $UO_2$ containing uranium of substantially natural or normal composition with reference to $U^{235}$. Also, the purification of the second composite solution in the manner described above is productive of a second batch of $UO_2$ containing uranium which is singly enriched with $U^{235}$. Finally, the purification of the third composite solution in the manner described above is productive of a third batch of $UO_2$ containing uranium which is doubly enriched with $U^{235}$. The first and second batches of $UO_2$ are then converted back to $UCl_4$ for retreatment in the first-stage and second-stage calutrons, respectively, while the third batch of $UO_2$ is available for commercial use. Before considering appropriate methods that may be employed for converting this $UO_2$ to $UCl_4$, if desired, other process factors will be discussed.

The process so far described for recovering uranium from wash solutions derived from calutrons is very effective, and is quite versatile in nature. Thus, not only may uranium be reclaimed from a wash solution containing the impurities mentioned, i.e., copper, iron, chromium and nickel, but the wash solution may contain a wide variety of other metallic impurities without adversely effecting the purification. In fact, certain metals such as zinc are purposely introduced as impurities incidental to the amalgam reduction step described herein. Investigation has shown that practically no metal ions interfere with the recovery and purification of uranium by the herein-described procedure; for example, manganese, molybdenum, silver and zinc do not impair the efficacy of the process. Tests made with solutions containing any one of more than a dozen other metal ions that might conceivably be encountered as impurities in normal calutron operation all resulted similarly, viz., no interference with the desired uranium recovery. Moreover, the purification can be carried out in the manner explained without particular reference to the identification of the impurities or the proportions contained in the wash solution. This feature is very advantageous, in view of the fact that both the particular impurities, as well as the related quantities thereof, vary considerably among the different wash solutions derived from the different calutrons.

Furthermore, it will be appreciated that in the present process the various steps of the recovery and purification of the uranium may be so correlated, if desired, that extraneous anions are not introduced into the various solutions, and that the $Cl^-$ anion is encountered throughout, thereby to maintain substantially constant the qualitative anion content in the various solutions. This may be brought about, having reference to Fig. 3, by employing a wash solution for the stainless steel collector which contains HCl, and by avoiding the use of any acid other than HCl in the various steps disclosed in Fig. 4 prior to the oxalate precipitation step. More particularly, the recovery of the residue of $UCl_4$ from the source regions of the various calutrons by the water wash step is productive of an acid solution containing $Cl^-$ anion; and the recovery of the metallic uranium from the collectors of the various calutrons by the hydrochloric acid-hydrogen peroxide wash step is productive of an acid solution containing $Cl^-$ anion. Also, in the principal purification step prior to the amalgam reduction of the various solutions, the solutions are acidified with hydrochloric acid, thereby maintaining the $Cl^-$ anion content of the solutions.

It may also be noted that the advantages of employing a liquid amalgam, such as zinc amalgam, for the reduction step prior to the separation of the uranium as uranous oxalate from metal impurities contained in the wash solution include the following: the manipulative procedure involved is extremely simple; no interfering impurities are introduced into the solution undergoing treatment; the spent amalgam after the reduction may be regenerated and reused repeatedly; the amalgam, being always in substantially liquid form, may be readily handled on a plant scale; and such of the metal impurities as are reduced to the metallic state become readily associated with the mercury of the amalgam, and, hence, are readily removed from the system.

In carrying out the present process it is again noted that in the purification of the second composite solution, comprising the acid wash derived from the first pocket of the collector of the first-stage calutron and the water wash derived from the source region of the second-stage calutron, and in the subsequent conversion of this second composite solution to produce the corresponding second batch of $UCl_4$, uranium is processed which has been singly enriched with $U^{235}$. Similarly, in the purification of the third composite solution, comprising the acid wash derived from the first pocket of the collector of the second-stage calutron, uranium is processed which has been doubly enriched with $U^{235}$. In view of the fact that the uranium contained in the second and third composite solutions has been either singly or doubly enriched with $U^{235}$, it is very valuable, and accordingly it is essential that none of this uranium be lost. Consequently, all precipitates and filtrates produced incident to processing the solutions mentioned, which might contain some of this extremely valuable uranium, are subjected to salvage treatment in order to reclaim any fractions of the contained uranium. One particularly advantageous salvage method that might be given for purposes of illustration is described hereinafter in connection with Fig. 5.

Considering now the details of the salvage of small fractions of uranium contained in various materials produced incident to carrying out the process, reference is made to the portion of the flow diagram illustrated in Fig. 5. More particularly, in the event the material which is to be subjected to salvage treatment is in solid form, it is first dissolved in HCl, thereby to obtain an acidified salvage solution. On the other hand, in the event the material which is to be subjected to salvage treatment is in liquid form, it is first treated with HCl, thereby to obtain an acidified salvage solution. For example, such material might comprise a precipitate of metal impurities carrying a small fraction of solid uranium, or a filtrate containing metal impurities and a small fraction of dissolved uranium. In any case, the acidified salvage solution is first produced, which solution might comprise the following ions of the fraction of uranium and the metal impurities: $UO_2^{++}$, $Fe^{+++}$, $Cr^{+++}$, $Ni^{++}$ and $Cu^{++}$, and with or without a slight $NO_3^-$ content. If there is more than a slight $NO_3^-$ content, the $NO_3^-$ content preferably is substantially eliminated by boiling the solution after adding excess HCl thereto.

A plurality of salvage solutions of the character mentioned are first prepared in accordance with the composition of the contained uranium fraction with reference to $U^{235}$. In other words, a first salvage solution is prepared comprising a fraction of uranium which is singly enriched with $U^{235}$; and a second salvage solution is prepared comprising a fraction of uranium which is doubly enriched with $U^{235}$; the salvage solutions mentioned being prepared from the materials from the corresponding portions of the prior recovery and purification steps, as previously explained, whereby the solutions are not mixed unless the contained uranium fractions are of substantially the same composition with reference to $U^{235}$.

The acidified salvage solution containing the ions mentioned is first reduced by treatment with liquid amalgam, such as zinc amalgam, in the manner already described in connection with the primary recovery operation, whereby uranyl, ferric and chromic ions are reduced to uranous, ferrous and chromous ions, respectively, while copper ($Cu^{++}$) and nickel ($Ni^{++}$) ions are reduced to their respective metallic states. Residual $NO_3^-$ that may be present in the solution is destroyed, the reaction products thereof being removed in the form of gaseous oxides of nitrogen, such as $NO_2$.

After separation of the spent amalgam, a reduced salvage solution is obtained which contains the following ions: $U^{++++}$, $Fe^{++}$, $Cr^{++}$ and $Zn^{++}$. The reduced solution may then be protected or fortified against reoxidation of the $U^{++++}$ to $UO_2^{++}$ by the addition thereto of $SnCl_2$, if desired, as and in the manner already described in connection with the primary treatment.

The reduced solution, with or without added $Sn^{++}$, is then divided into a number of portions of appropriate volume for handling purposes, and to a first of these portions there is added a suitable quantity of a compound of an alkaline earth metal the oxalate of which is relatively water-insoluble, preferably in solid form. $CaCl_2$ is suitable for this purpose, although it may be found desirable in this case to add a basic substance such as NaOH to reduce the acidity of the solution, thereby decreasing the solubility of calcium oxalate, prior to the oxalate precipitation step. If desired, solid CaO alone may be conveniently employed to perform both functions, vis., reducing the acidity of the solution while supplying calcium ions thereto. The first portion is stirred until the calcium compound is dissolved, whereupon an excess of $H_2C_2O_4$ is added, whereby $CaC_2O_4 \cdot H_2O$ and $U(C_2O_4)_2 \cdot 6H_2O$ are precipitated away from the metal impurities in the acid solution. The quantity of calcium compound dissolved in the first portion, as explained above, is such that after precipitation of the calcium oxalate and uranous oxalate by the oxalic acid, the hydrogen ion content of the solution is about 1 N to 3 N. This arrangement prevents precipitation of the ferrous, chromous and zinc oxalates, as well as (if tin is present) stannous oxalate. Also, it will be understood that the calcium oxalate precipitate not only carries the uranous oxalate precipitate which is produced, but it also carries, due to surface action, any small amount of uranous ions which are not precipitated as uranous oxalate. The solution is then filtered and the calcium oxalate and uranous oxalate precipitate is washed with a dilute oxalic acid solution. The calcium oxalate precipitate carrying the uranium is then conserved for further use.

The calcium oxalate precipitate carrying the uranium obtained in the manner described above is then treated with a solution of 6 N HCl and the residue is filtered off, whereby the calcium oxalate is dissolved in the acid, leaving the uranous oxalate as a residue. Uranous oxalate residues obtained in this manner may be allowed to accumulate for several batches, then returned to the salvage cycle for ultimate recovery of the enriched uranium. The filtrate from the acid treatment, containing the calcium ions and residual uranous ions, is then introduced into a second portion of the salvage solution mentioned and, if desired, after adjustment of the acidity with a basic substance such as NaOH, or a further quantity of CaO, an excess of $H_2C_2O_4$ is added thereto, whereby $CaC_2O_4 \cdot H_2O$ and $U(C_2O_4)_2 \cdot 6H_2O$ are again precipitated away from the metal impurities in the solution. Thus, the calcium oxalate carries the uranous oxalate precipitate which is produced and also any small amount of uranous ions which are not precipitated as uranous oxalate. The solution is then filtered and the calcium oxalate and uranous oxalate precipitate is washed with a dilute oxalic acid solution. The calcium oxalate precipitate carrying the uranium is then conserved for further use in the manner already described.

The above-described cycle, wherein the calcium oxalate precipitate carrying uranium is dissolved in acid, and the calcium reemployed in the treatment of different portions of the solution, is repeated an appropriate number of times, until the calcium oxalate carries an appropriate amount of uranous oxalate; at which time the pranium carried by the calcium oxalate is recovered therefrom.

More particularly, the calcium oxalate carrying uranous oxalate (with which may be combined the uranous oxalate residues mentioned in the second preceding paragraph, if desired) is calcined in a non-oxidizing atmosphere, such as nitrogen or hydrogen, at about 500° C. in order to produce CaO and $UO_2$, whereby CO and $CO_2$ gases and water vapor are given off incident to the calcination.

The calcium oxide and uranium dioxide residue is dissolved in a suitable solvent, such as $HNO_3$ or a mixture of HCl and $H_2O_2$, whereby a solution containing uranyl and calcium ions is produced. The solution containing the $UO_2^{++}$ and $Ca^{++}$ ions is then treated with ammonia, either in the form of $NH_3$ gas or carbonate-free $NH_4OH$ solution, whereby the uranium is precipitated as $(NH_4)_2U_2O_7$ away from the calcium that remains in solution as $Ca^{++}$. The solution is then filtered and the ammonium diuranate precipitate is washed with an aqueous solution containing about one percent $NH_4OH$ and one percent $NH_4NO_3$ or $NH_4Cl$ (depending upon whether the solvent for the $CaO—UO_2$ residue included $HNO_3$ or HCl), in order to carry any occluded calcium into the filtrate. The filtrate containing the calcium impurity is discarded, and the ammonium diuranate thus obtained in relatively pure form is then stored for further treatment or commercial use, as desired.

It will be understood that when a first salvage solution containing a fraction of uranium which is singly enriched with $U^{235}$ is treated in the manner described above, a first quantity of $(NH_4)_2U_2O_7$ is produced, comprising uranium of a like isotopic composition. Also, when a second salvage solution containing a fraction of uranium which is doubly enriched with $U^{235}$ is treated in the manner described above, a second quantity of $(NH_4)_2U_2O_7$ is produced, comprising uranium of a like isotopic composition. The first and second quantities of $(NH_4)_2U_2O_7$ obtained in the manner explained above may be processed in such manner as to obtain $UCl_4$ as the end product, and this may be effected, if desired, by producing $UO_2$ as an intermediate product. In this case, such intermediate $UO_2$ as is thereby produced may be very conveniently combined with the $UO_2$ obtained as a result of the primary purification steps shown in Fig. 4 for subsequent processing to obtain $UCl_4$ as an end product, if desired. Of course, in combining the uranium compounds for subsequent processing, care will be taken to combine only those compounds comprising uranium of substantially similar isotopic composition.

Considering now the details of the ultimate conversion to $UCl_4$ of the $UO_2$ or the $(NH_4)_2U_2O_7$ that is obtained by the purification process set forth in connection with Fig. 4 or Fig. 5, respectively, reference is made to the portion of the flow diagram illustrated in Fig. 6. More particularly, assuming that the starting material is ammonium diuranate as obtained from the salvage cycle of Fig. 5, a batch of $(NH_4)_2U_2O_7$ is calcined at approximately 300° C. in order to produce $UO_3$, whereby $NH_3$ gas and water vapor are given off incident to the calcination. The $UO_3$ thus produced may be converted into crude $UCl_4$ by alternative processes, depending upon whether or not it is desired to process in the same operation $UO_2$ that has been obtained from the primary purification procedure of Fig. 4; it being understood of course that an important criterion is that these uranium compounds to be processed in admixture shall comprses uranium having a substantially similar isotopic composition. In accordance with this variation, and assuming that it is desired simultaneously to process $UO_2$ that has been obtained from the primary purification procedure, the $UO_3$ mentioned is first reduced to $UO_2$ by heating with $CH_4$ (see the left-hand portion of Fig. 6) at approximately 450° C., whereby $CO_2$ and CO gases and water vapor are given off incident to the reduction. The $UO_2$ thus produced may then be combined, if desired, with an original batch of $UO_2$ obtained from the primary purification procedure of Fig. 4 for further processing, provided as aforesaid that the isotopic constituency of the contained uranium is substantially similar. The $UO_2$ thus produced, and either with or without $UO_2$ from the primary purification procedure, is then reacted with $CCl_4$ in the vapor phase at approximately 450° C. in a suitable reaction chamber, in order to produce crude $UCl_4$, whereby $COCl_2$, $CO_2$, CO and $Cl_2$ gases are given off incident to the reaction. In accordance with an alternative process wherein it is not desired or necessary simultaneously to process $UO_2$ obtained from a primary purification procedure, the $UO_3$ obtained by calcining the ammonium diuranate in the manner above mentioned may be reacted directly with $CCl_4$ (see the right-hand portion of Fig. 6) in the liquid phase in an autoclave at a temperature of approximately 140° to 160° C. and at a pressure of approximately 200 pounds per square inch gauge, in order to produce $UCl_5$, whereby $COCl_2$, $CO_2$, CO and $Cl_2$ gases are given off incident to the reaction. The uranium pentachloride thus produced is then calcined or decomposed to produce crude $UCl_4$ by heating to approximately 350° C., whereby $Cl_2$ gas is given off incident to the calcination.

In any case, the crude uranium tetrachloride produced by either of the alternative processes indicated is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ may be ultimately converted to $UCl_4$. The sublimate of $UCl_4$ thus produced is of very pure form and is suitable for recycling in the appropriate one of the first-stage or second-stage calutrons in the manner previously explained. More particularly, the conversion of the first batch of $UO_2$ from the primary purification procedure is productive of a first batch of $UCl_4$ containing uranium of natural or normal composition with reference to $U^{235}$; this first batch of $UCl_4$ is recycled in the first-stage calutron. Also, the conversion of a first batch of $(NH_4)_2U_2O_7$ from the salvage cycle and/or a second batch of $UO_2$ from the primary purification procedure is productive of a second batch of $UCl_4$ containing uranium singly enriched with $U^{235}$; this second batch of $UCl_4$ is recycled in the second-stage calutron. Finally, the conversion of a second batch of $(NH_4)_2U_2O_7$ from the salvage cycle is productive of a third batch of $UCl_4$ containing uranium doubly enriched with $U^{235}$; this third batch of $UCl_4$ is suitable for any desired commercial use.

It will be apparent, of course, from consideration of the flow sheet of Fig. 6 that, if desired, $UO_2$ and $(NH_4)_2U_2O_7$ may be processed entirely independently of each other in order to produce $UCl_4$ as an end product.

It is to be understood that salvage procedures other than that specifically described above by way of illustration may be employed in conjunction with the hereindescribed primary uranium recovery procedure without sacrificing all the advantages of the combination of the two in the particular manner disclosed herein. Similarly, the particular salvage procedure disclosed may be combined advantageously with other primary uranium recovery procedures.

In view of the foregoing, it is apparent that there has been provided an improved process of recovering, reclaiming, salvaging, purifying and converting uranium, both in metallic and compound forms, in conjunction with the calutron method, whereby uranium enriched with $U^{235}$ may be produced on a large scale in commercial quantities.

Also, it will be understood that the present process may be suitably modified so that a compound of uranium other than $UCl_4$ may be treated either in the first-stage or in the second-stage calutron. For example, the calutron, as well as the conversion steps of the process, may be modified, whereby $UCl_6$, $UBr_4$, etc. may be treated in order to produce uranium enriched with $U^{235}$.

While particular reference has been made to the use of zinc amalgam as the liquid amalgam reducing agent in connection with the above-identified process, other liquid amalgams may be employed in like manner. For example, sodium amalgam, prepared by any conventional method, may be employed with generally similar results. In general, it may be stated that one may employ any metal which combines with mercury to form a liquid amalgam, and which does not form an insoluble compound in the presence of oxalate ion under the acid conditions such as are described herein, and which has a potential as a reducing agent of at least $+0.41$ volt, as indicated in the table "Standard Oxidation-Reduction Potentials" at pp. 1357-8 of the "Chemical Rubber Handbook," 28th edition, 1944. It will be understood that the value $+0.41$ corresponds to the value for the reduction potential of $UO_2^{++}$ to $U^{++++}$, as shown in the table cited.

The term "uranium" is employed in the present specification and claims in a generic sense, i.e., as applying to uranium whether in elemental, combined or ionic form, unless indicated otherwise by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a process for recovering uranium values from substances containing uranium and impurities including iron, chromium, nickel and copper, the steps comprising producing an oxidized acidic aqueous solution of said substances containing the uranium values and said impurities, treating said solution to recover the major portion of the uranium values therefrom and also obtaining a salvage material containing a minor portion of the uranium together with said impurities, producing an acidified salvage solution of said salvage material containing $UO_2^{++}$, $Ni^{++}$, $Fe^{+++}$, $Cu^{++}$ and $Cr^{+++}$ ions, contacting the salvage solution with a liquid amalgam produced from Hg and a metal selected from the group consisting of zinc and sodium, whereby the $UO_2^{++}$, $Fe^{+++}$ and $Cr^{+++}$ ions are reduced to $U^{++++}$, $Fe^{++}$ and $Cr^{++}$ ions and the $Cu^{++}$ and $Ni^{++}$ ions are reduced to the metallic state and are associated with the spent amalgam, separating the reduced salvage solution from the spent amalgam and associated impurities, precipitating calcium oxalate from the reduced salvage solution by adding a soluble calcium compound and oxalic acid thereto under conditions such that the final hydrogen ion content of the solution is about 1 N to 3 N, whereby uranous oxalate coprecipitates with and residual uranous uranium is carried from the solution by said calcium oxalate, separating the solution from the calcium oxalate precipitate containing the uranium, calcining said precipitate to produce a mixture of calcium oxide and uranium dioxide therefrom, dissolving said mixture in an oxidizing acid solution yielding uranyl and calcium ions therein, adding ammonia to said solution to precipitate the uranium as ammonium diuranate away from the calcium in the solution, and separating the ammonium diuranate from the solution.

2. In a process for recovering uranium values from substances containing uranium and impurities including iron, chromium, nickel and copper, the steps comprising producing a hydrochloric acid solution of said material containing $UO_2^{++}$, $Fe^{+++}$, $Cr^{+++}$, $Cu^{++}$ and $Ni^{++}$ ions and at most only small amounts of $NO_3^-$ ions, adjusting the acidity of the solution to the range of 3 N to 6 N in HCl, contacting said solution with an excess of liquid amalgam prepared from mercury and metals of the group consisting of zinc and sodium, whereby $U^{++++}$, $Fe^{++}$, $Cr^{++}$ and $Zn^{++}$ ions are produced in the solution; residual $NO_3^-$ is expelled from the solution as $NO_2$ and the $Cu^{++}$ and $Ni^{++}$ ion impurities are reduced to the metallic state and associate with the spent amalgam, separating the reduced solution from the spent amalgam and associated impurities, adding excess oxalic acid to the solution to precipitate uranous oxalate away from the ion impurities in the solution, and separating the uranous oxalate from the solution.

3. In a process for recovering uranium values from substances containing uranium and impurities including iron, chromium, nickel and copper, the steps comprising producing a hydrochloric acid solution of said substance containing $UO_2^{++}$, $Fe^{+++}$, $Cr^{+++}$, $Cu^{++}$ and $Ni^{++}$ ions and limited amounts of $NO_3^-$ ions, adjusting the acidity of the solution to the range of 3 N to 6 N of HCl, contacting said solution with an excess of a liquid amalgam prepared from mercury and metals of the group consisting of zinc and sodium, whereby $U^{++++}$, $Fe^{++}$, $Cr^{++}$ and $Zn^{++}$ ions are produced in the solution, residual $NO_3^-$ is expelled from the solution as $NO_2$ and the $Cu^{++}$ and $Ni^{++}$ ion impurities are reduced to the metallic state and associate with the spent amalgam, separating the reduced solution from the spent amalgam and associated impurities, adding stannous chloride to the solution to stabilize the uranous oxidation state of the uranium, adding excess oxalic acid to the solution to precipitate uranous oxalate away from the ion impurities in the solution, and separating the uranous oxalate from the solution.

4. The process as defined in claim 3 wherein stannous chloride is added to the reduced solution prior to said treatment with oxalic acid so as to stabilize the uranous oxidation state of the uranium therein.

5. In a process for recovering uranium values from a solution containing $UO_2^{++}$, $Fe^{+++}$, $Cr^{+++}$ ions and relatively large amounts of ions selected from the group consisting of $Cu^{++}$, $Ni^{++}$ and $NO_3^-$ ions, the steps comprising adding ammonia to said solution to precipitate the uranium, iron and chromium away from the major portion of the ionic materials of said group, separating the precipitate from the solution, dissolving the precipitate in dilute HCl, thereby producing a solution containing $UO_2^{++}$, $Fe^{+++}$, $Cr^{+++}$ and relatively small amounts of $Cu^{++}$, $Ni^{++}$ and $NO_3^-$ ions, adjusting the acidity of the solution to the range of about 3 N to 6 N in HCl, then contacting said solution with an excess of a liquid zinc amalgam, whereby $U^{++++}$, $Fe^{++}$, $Cr^{++}$ ions are produced therein, $NO_3^-$ ions are expelled from the solution as gaseous oxides of nitrogen and $Cu^{++}$ and $Ni^{++}$ ions are reduced to the metal and associate with the spent amalgam, separating the spent amalgam and associated copper and nickel from the solution, treating said solution with excess oxalic acid under conditions such that the hydrogen ion concentration of the solution is in the range of about 3 N to 6 N in HCl to precipitate uranous oxalate away from the iron and chromium in the solution, separating the uranous oxalate from the solution, and calcining the uranous oxalate to form $UO_2$.

6. The process as defined in claim 5 wherein the acidity of said solution is adjusted to the value of about 5 N in HCl prior to the reducing step.

References Cited in the file of this patent

Kohlschutter et al.: Berichte der Deutsche Chemische Gesellschaft, vol. 34, pp. 1472–1479 and 3619–3635 (1901).

Masuda: Chemical Abstracts, vol. 27, p. 5620 (1933).

Latimer: Oxidation Potentials, pp. 155, 210, and 239 (1938), Prentice-Hall, Inc., N.Y.

Accum: A Practical Essay on Chemical Re-agents or Tests, p. 68 (1817). Published by M. Carey & Son, Philadelphia, Pa.